United States Patent Office 2,742,305
Patented Apr. 17, 1956

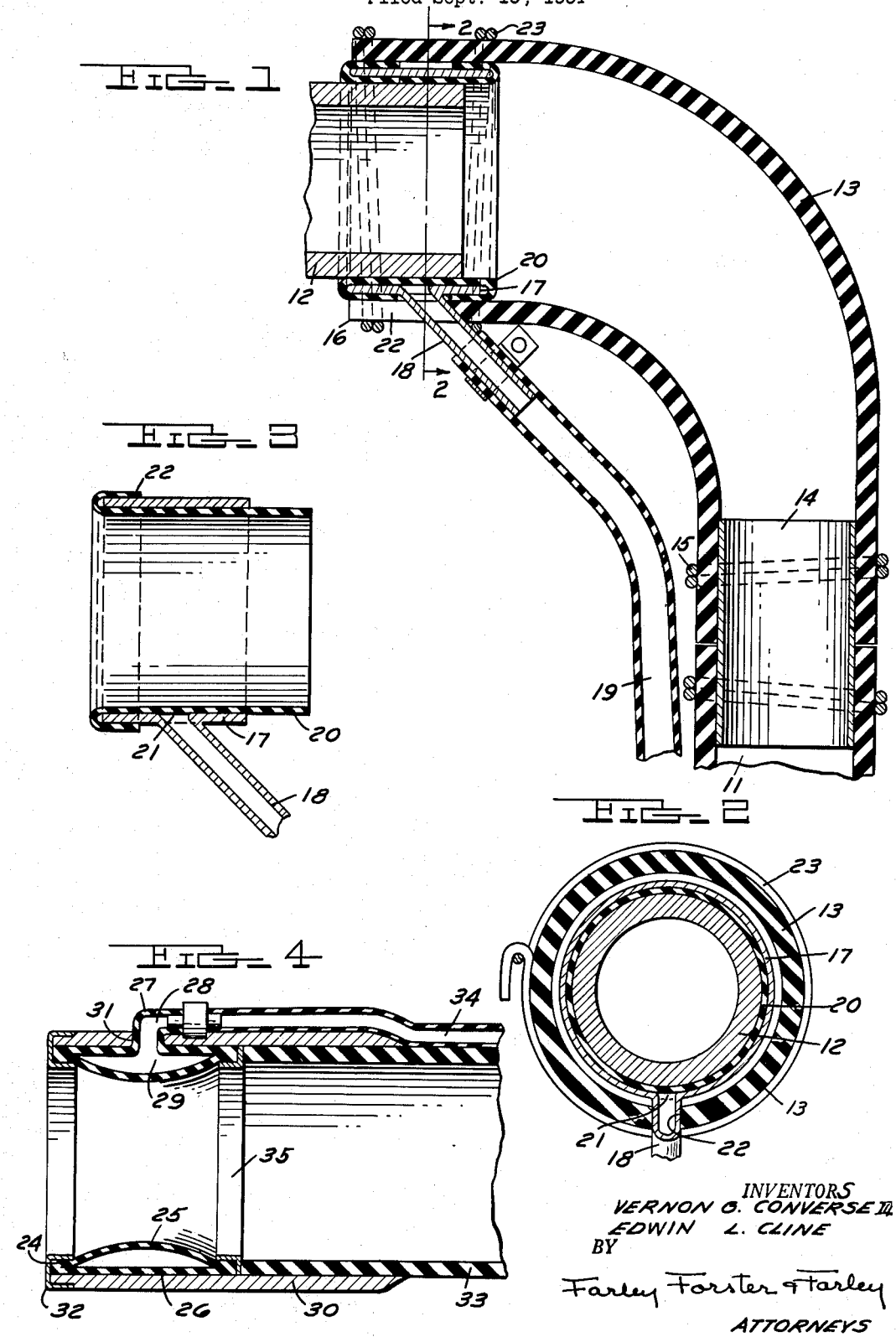

2,742,305

QUICK DETACHABLE, FLUID PRESSURE ACTUATED COUPLING

Vernon G. Converse III, Dearborn, Mich., and Edwin L. Cline, Altadena, Calif., assignors to George L. Nankervis Company, Detroit, Mich., a corporation of Michigan Application September 13, 1951, Serial No. 246,446

4 Claims. (Cl. 285—165)

This invention relates to a quick detachable coupling attaching a conduit to a nipple or spigot end of another conduit wherein a sealed joint is formed and maintained by the application of fluid pressure to a flexible sealing element of the coupling. With no fluid pressure applied to the coupling the two conduit elements can be easily connected together, or separated.

A device constructed in accordance with the invention is particularly useful in test stand work for example, where a fluid supply line of some sort is repeatedly connected to, and disconnected from successive devices brought to the stand for testing their operation. Preferably, the coupling is employed in connection with a flexible conduit to facilitate the attachment and detachment; and, a fluid pressure supply line for actuating the sealing element of the coupling is associated with such flexible conduit.

Two forms of the invention are disclosed in the accompanying drawing. The first of these forms is shown in Figs. 1 to 3, and consists in a coupling construction for use with a conduit element which performs the function of an adaptor for securing a length of conduit of standard construction to another conduit element which may be of any construction and outside diameter. In the second form of the invention, shown in Fig. 4, the coupling is attached more directly to a standard conduit element. The form of the invention of Figs. 1 to 3 is particularly suitable for use with flexible type conduits, since conventional types of hose clamps may be employed for connecting the various elements together. A complete description of the above mentioned and other views of this drawing is as follows:

Fig. 1 is a side elevation, in section, showing a coupling of the invention associated with an adaptor member and standard conduit element, and operating to connect this conduit element to a pipe fitting, such as a water inlet or outlet connection of an internal combustion engine;

Fig. 2 is a section taken along the line 2—2 of Fig. 1;

Fig. 3 is a side elevation of the coupling element of the construction of Figs. 1 and 2 showing a method of assembly thereof; and Fig. 4 is a side elevation, in section, of a coupling construction associated with a conduit element which may be either of rigid or flexible construction.

With either form of the invention, the sealing element of the coupling consists essentially of a flexible diaphragm of circular cross section which can be expanded inwardly by the application of fluid pressure. This diaphragm is employed in connection with a rigid element, also of circular cross section, which limits or prevents outward expansion of the diaphragm member and to which the diaphragm is suitably connected. A fluid pressure supply line passes through this rigid member and communicates with the interior of the diaphragm.

Referring to Figs. 1 and 3, the coupling and its associated adaptor member are employed for connecting a conduit 11, which may be a flexible type, to a conduit element 12, which is of rigid construction. The element 12 may, for example, be formed by a water inlet or outlet nipple of an internal combustion engine. An elbow-shaped adaptor 13 is connected to the conduit 11 by an internally placed metal sleeve 14 and a standard type hose clamp 15. From the area of its engagement with the sleeve 14, the adaptor 13 is formed with a gradually increasing internal diameter so that at the mouth 16 of the adaptor such diameter is considerably greater than the outside diameter of the nipple 12.

The coupling assembly is inserted within the mouth 16 of the elbow, and as perhaps shown more clearly in Fig. 3, this assembly consists of a length of tubing 17, a nipple 18 for the connection of a fluid pressure supply line 19, and a diaphragm 20 formed from a sleeve of resilient material. A hole 21 is formed in the wall of the length of tubing 17 and the nipple 18 is connected to the tubing adjacent this hole to form a fluid pressure supply passage communicating with the interior of the length of tubing 17. The diaphragm member 20 has an outside diameter slightly less than the inside diameter of the length of tubing 17 and is formed longer than the latter so that when the two parts are assembled as shown in Fig. 3 the overlapping ends of the diaphragm can be bent back over the outside of the tubing 17 as illustrated by the end 22.

With both ends of the diaphragm bent over the outside of the tubing 17, the coupling assembly can be inserted within the mouth 16 of the adaptor 13, a slot 22 being formed in the mouth to receive the nipple 18. A conventional hose clamp 23 is then employed to retain the coupling assembly in position.

In the alternate construction of Fig. 4, a diaphragm assembly of unitary construction is used, which consists of an annular molded flexible member 24, having an inner wall 25 and an outer wall 26. A nipple 27 is formed integrally with the outer wall 26 to provide a communicating passage 28 between the chamber 29 of the diaphragm and a fluid supply line. The diaphragm member 24 is employed in conjunction with an adaptor sleeve 30 having a hole 31 in the wall thereof to receive the nipple 27 of the diaphragm, and having an inside diameter dimensioned to receive the outside diameter of the diaphragm. The diaphragm is held in position within the sleeve by an inner retainer member 35 and an outer retainer 32.

A conduit element 33 is shown in engagement with the sleeve 30. This conduit may be either of flexible or rigid construction. If the former, a press type fit is employed; whereas if the latter, any conventional form of attachment may be used such as welding. A source of fluid pressure (not shown) is connected to the chamber 29 of the diaphragm 24 through a fluid pressure supply line 34. With either form of the invention the diaphragm assembly is preferably dimensioned to provide a free fit with the conduit element with which the coupling is to be employed so that the two conduit elements may be readily attached together with a minimum amount of effort. After the coupling is slipped over a conduit element, such as the nipple 12 of Fig. 1, the application of fluid pressure through the supply line 19 to the interior of the diaphragm forces the inner surface thereof into intimate sealing engagement with the outer surface of the conduit element. Upon the removal of the application of this fluid pressure the diaphragm of course collapses, and the coupling can readily be detached.

We claim:

1. A fluid pressure actuated coupling of the type employing a resilient internally expansible diaphragm element comprising a relatively rigid impervious cylindrical sleeve, a resilient cylindrical diaphragm positioned within said cylindrical sleeve to form a fluid pressure chamber in conjunction therewith, the length of said diaphragm being greater than the length of said sleeve, the extending end portions of said diaphragm being turned back over the outer surface of said sleeve, a fluid pressure supply line secured to said sleeve and extending through the wall thereof, a conduit having a relatively resilient mouth portion encircling said sleeve and end portions of said diaphragm, clamp means encircling the outer surface of said mouth portion and forcing said mouth portion inwardly to seal the end portions of said diaphragm to said sleeve and to the inner surface of said mouth portion and an opening in the wall of said conduit for the passage of said fluid pressure supply line.

2. A fluid pressure actuated sealing element for establishing a fluid-tight coupling between the outer wall of one conduit member and the inner wall of a second overlapping flexible conduit member, comprising, a relatively rigid cylindrical sleeve, a resilient cylindrical diaphragm member positioned within said sleeve, the ends of said diaphragm member extending beyond the ends of said sleeve and turned back over the ends of said sleeve into overlapping relation with the end portions of the outer cylindrical surface thereof, means to seal said diaphragm ends to said sleeve and to the said inner wall of the overlapping conduit member comprising a circumferentially contractable clamp engaging the outer wall of said overlapping conduit member to force the inner wall thereof into engagement with the overlapping end portions of said diaphragm and to force the said overlapping end portions of said diaphragm into engagement with the outer surface of said sleeve, and means for supplying fluid pressure to said diaphragm through the walls of said overlaping conduit member and said sleeve.

3. A quick detachable, fluid pressure operable coupling for establishing a connection between two overlapping conduits, comprising a coupling and sealing element positionable between the overlapping surfaces of said conduits, said coupling including a tubular sleeve having inner and outer cylindrical surfaces, a cylindrical diaphragm having a length exceeding the length of said sleeve and positioned contiguous with one of the cylindrical surfaces thereof with the end portions of said diaphragm projecting beyond the ends of said sleeve and bent back in overlapping relation with the end portions of the other cylindrical surface of said sleeve, a fluid pressure passage extending between the said outer and inner cylindrical surfaces of said sleeve, and clamp means for connecting said sealing element to one of said conduits, said clamp means sealing the overlapping end portions of said diaphragm to said sleeve.

4. A fluid pressure operable coupling for establishing a connection between outer and inner overlapping conduits, including a coupling and sealing element positionable between the overlapping surfaces of said conduits, said element comprising a tubular sleeve having inner and outer cylindrical surfaces, a cylindrical diaphragm extending along the inner cylindrical surface of said sleeve and over the outer cylindrical surface of the end portions thereof, means sealing each end of said diaphragm to said outer cylindrical surface of said sleeve and to the inner surface of said outer conduit, and a fluid pressure passage extending through said outer conduit and said sleeve whereby fluid pressure can be admitted between said diaphragm and the said inner cylindrical surface of said sleeve to expand said diaphragm into sealing engagement with said inner conduit.

References Cited in the file of this patent

UNITED STATES PATENTS

| | | |
|---|---|---|
| 1,078,957 | Rinaldo | Nov. 18, 1913 |
| 1,861,726 | Trout | June 7, 1932 |
| 2,344,238 | Finch | Mar. 14, 1944 |
| 2,523,716 | Parr | Sept. 26, 1950 |

FOREIGN PATENTS

| | | |
|---|---|---|
| 6,982 | Germany | Jan. 18, 1879 |